United States Patent [19]

Ebert et al.

[11] Patent Number: 4,760,128

[45] Date of Patent: Jul. 26, 1988

[54] PROCESS FOR THE PREPARATION OF HIGH MOLECULAR WEIGHT, OPTIONALLY BRANCHED POLYARYLENE SULPHIDE WITH MONOMERCAPTAN COMPOUND

[75] Inventors: Wolfgang Ebert; Karsten Idel, both of Krefeld; Rüdiger Schubart, Bergisch Gladbach, all of Fed. Rep. of Germany

[73] Assignee: Bayer Aktiengesellschaft, Leverkusen, Fed. Rep. of Germany

[21] Appl. No.: 893,779

[22] Filed: Aug. 6, 1986

[30] Foreign Application Priority Data

Aug. 17, 1985 [DE] Fed. Rep. of Germany ....... 3529500

[51] Int. Cl.[4] .............................................. C08G 75/16
[52] U.S. Cl. .................................................... 528/388
[58] Field of Search ......................................... 528/388

[56] References Cited

U.S. PATENT DOCUMENTS

| | | | |
|---|---|---|---|
| 3,386,950 | 6/1968 | Horvath et al. | 528/388 |
| 3,870,686 | 3/1975 | Campbell | 528/388 |
| 4,535,149 | 8/1985 | Ebert et al. | 528/388 |
| 4,605,713 | 8/1986 | Heitz et al. | 528/388 |

Primary Examiner—Harold D. Anderson
Attorney, Agent, or Firm—Connolly and Hutz

[57] ABSTRACT

The invention relates to a process for the preparation of high molecular weight, optionally branched polyarylene sulphides with melt viscosities which can be adjusted within a defined range, a high stability of the melt and low corrosion.

These polyarylene sulphides are obtained by reacting alkali metal sulphides, if appropriate mixed with alkali metal bisulphides and reaction accelerators, with dihalogenoaromatics and, if appropriate, polyhalogenoaromatics, with the addition of particular monomercapto compounds.

7 Claims, No Drawings

PROCESS FOR THE PREPARATION OF HIGH MOLECULAR WEIGHT, OPTIONALLY BRANCHED POLYARYLENE SULPHIDE WITH MONOMERCAPTAN COMPOUND

The invention relates to a process for the preparation of high molecular weight, optionally branched polyarylene sulphides from alkali metal sulphides and dihalogenoaromatics in a polar solvent in the presence of 0.05 to 5.0 mol %, preferably 0.1 to 2.5 mol %, of a monomercapto compound. The polyarylene sulphides thus obtained have defined melt viscosities and are distinguished by a high stability of the melt and low corrosion.

Polyarylene sulphides and their preparation are known (see, for example, U.S. Pat. Nos. 2,513,188, 3,117,620 and 3,354,129).

Thus, it is known that the addition of inorganic or organic salts to the reaction mixture contributes to the reduction in the melt flow or to the increase in the melt viscosity of the polyphenylene sulphides obtained. Only if the melt viscosity is sufficiently high can polyphenylene sulphides be processed as thermoplastics, for example to give injection-moulded components, films and fibres. Without the addition of the abovementioned salts, polyphenyl sulphides which achieve the necessary low melt flow only via a separate and additional post-condensation or hardening (curing) are obtained.

The salts which are known to be employed are, for example, alkali metal carboxylates (DE-AS (German Published Specification) No. 2,453,749), lithium halides or alkali metal carboxylates (DE-OS (German Published Specification). No. 2,623,362), lithium chloride or lithium carboxylate (DE-OS (German Published Specification) No. 2,623,363), alkali metal carbonates in combination with alkali metal carboxylates (U.S. Pat. No. 4,038,259), lithium acetate (DE-OS (German Published Specification) No. 2,623,333), tri-alkali metal phosphates (DE-OS (German Published Specification) No. 2,930,710), tri-alkali metal phosphonates (DE-OS (German Published Specification) No. 2,930,797), alkali metal fluorides (DE-OS (German Published Specification) No. 3,019,732), alkali metal sulphonates (U.S. Pat. No. 4,038,260) and lithium carbonate and lithium borate (U.S. Pat. No. 4,030,518).

In DE-OS (German Published Specification) No. 3,120,538, polyarylene sulphides with high melt viscosities are furthermore obtained by addition of N,N-dialkylcarboxylic acid amides to the reaction mixture.

The use of polar solvents for the preparation of polyarylene sulphides is likewise described there.

It has now been found that, by addition of certain monomercapto compounds to the reaction mixture, polyarylene sulphides have been obtained which have melt viscosities which can be reproducibly established and are distinguished by a high stability of the melt and low corrosion during processing.

The invention therefore relates to a process for the preparation of optionally branched polyarylene sulphides from (a) 50–100 mol % of dihalogenoaromatics of the formula (I)

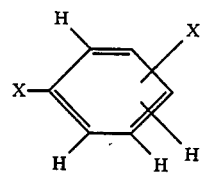

and 0–50 mol % of dihalogenoaromatics of the formula (II)

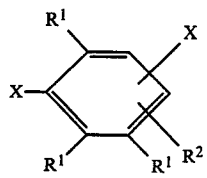

in which
the symbols X represent halogen, such as chlorine or bromine, in the meta- or para-position relative to one another and
the symbols $R^1$ and $R^2$ are identical or different and can be hydrogen, $C_1$–$C_4$-alkyl, $C_5$–$C_{10}$-cycloalkyl, $C_6$–$C_{10}$-aryl, $C_7$–$C_{10}$-alkylaryl, $C_7$–$C_{14}$-arylalkyl, it being possible for two radicals $R^1$, in the ortho-position relative to one another to be linked to form an aromatic ring or a heterocyclic ring containing up to 3 heteroatoms, such as N, O or S, and one radical $R^1$ always being other than hydrogen, and (b) 0–5 mol %, preferably 0.1–2.5 mol %, based on the sum of the dihalogenoaromatics of the formula I and II, of a tri- or tetrahalogenoaromatic of the formula (III)

$$ArX_n \qquad (III)$$

wherein
Ar is an aromatic $C_6$–$C_{14}$ radical or a heterocyclic radical with 5–14 ring atoms, it being possible for up to 3 ring C atoms to be replaced by heteroatoms, such as N, O or S,
X represents halogen, such as chlorine or bromine, and
n represents the number 3 or 4, and (c) 50–100 mol % of an alkali metal sulphide, preferably sodium sulphide or potassium sulphide or a mixture thereof, for example in the form of their hydrates or aqueous mixtures, if appropriate together with small amounts of alkali metal hydroxides, such as sodium hydroxide and potassium hydroxide, and 0–50 mol % of an alkali metal bisulphide, preferably sodium bisulphide or potassium bisulphide or a mixture thereof, it being possible for the molar ratio of (a+b):c to be in the range from 0.75:1 to 1.25:1, (d) if appropriate in the presence of reaction accelerators, such as alkali metal carboxylates, alkali metal phosphates, alkali metal phosphonates, alkali metal fluorides or alkali metal alkylsulphonates, or in the presence of N,N-dialkylcarboxylic acid amides, lactams, anhydrides and esters of carboxylic acids, characterized in that 0.05–5.0 mol %, preferably 0.1 to 2.5 mol %, of a monomercapto compound of the formula IV $$(R-A-S)_tW \qquad (IV)$$

in which t represents the number 1 or 2,

SW represents a mercapto or mercaptide group,

W represents hydrogen, an alkali metal, such as Li, Na or K, or NH$_4$+, and, in the case where t represents the number 2, can also represent an alkaline earth metal, such as Mg, Ca, Ba or Zn, A represents a C$_1$-C$_{30}$ aliphatic or C$_6$-C$_{24}$ aromatic radical or a heterocyclic radical containing one up to three heteroatoms, such as N, O or S, such as, for example, C$_1$-C$_{18}$-alkylidene,

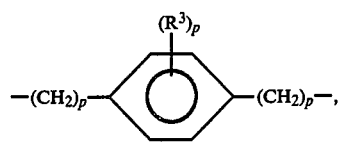

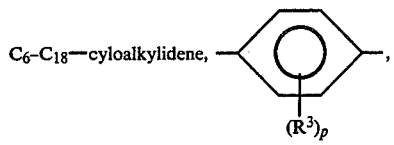

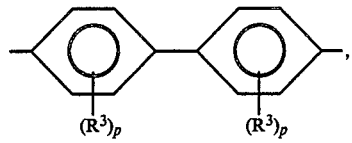

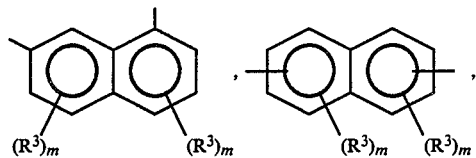

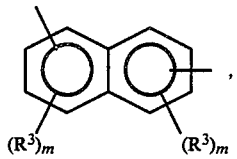

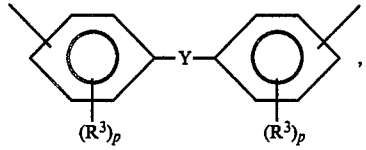

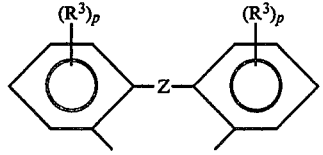

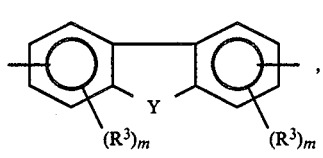

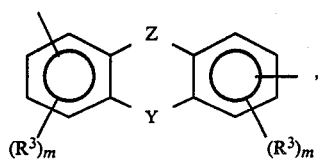

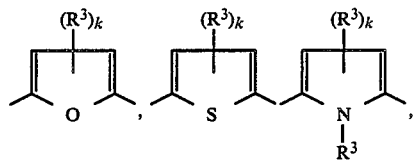

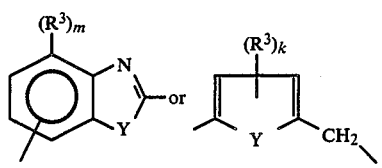

wherein the radicals R$_3$ independently of one another represent C$_1$-C$_8$ alkyl, alkaryl/aralkyl, C$_3$-C$_6$-cycloalkyl or hydrogen and Y represents O NR$^3$, S, SO$_2$ or CO, Z represents C$_1$-C$_6$-alkylidene, C$_2$-C$_6$-cycloalkylidene, CO, —S—, $$S, \overset{O}{\underset{O}{\overset{\|}{\underset{\|}{S}}}} -,$$

O or a single bond, k represents the number 0, 1, or 2 m represents the number 0, 1, 2, or 3 p represents the number 0, 2, 3, or 4

R has the abovementioned meaning of R$^3$ are added to the reaction mixture.

The process according to the invention can be carried out in various ways.

The alkali metal sulphides are preferably employed in the form of their hydrates and aqueous mixtures or aqueous solutions. Dehydration can be partial, but is preferably carried out completely. The water present in the reaction mixture is distilled out of the batch. The distillation of the water can be carried out directly or with the aid of agents which form azeotropes, the dihalogenoaromatics preferably being employed as agents which form an azeotrope. For the dehydration, all the reaction partners can be mixed and dehydration of the entire mixture can be carried out. The alkali metal sulphide can also be dehydrated separately with some of the reaction components or by itself.

In one embodiment of the reaction, the reaction partners are continuously brought together with the reaction accelerator or a mixture of reaction accelerators in the presence of the polar solvent, the water being simultaneously removed. In this procedure, a reaction which starts can be controlled via the rates of metering. Longer residence times of the water can thus also be avoided.

If complete dehydration is carried out, the reaction can be carried out under normal pressure or under a low pressure of up to about 3 bar. To achieve higher reaction temperatures above the boiling point of the solvent or of the mixture of solvent and di- and polyhalogenoaromatics, higher pressures of up to 50 bar can be applied.

The reaction can be carried out continuously or discontinuously. The reaction time can be varied within a wide range. It can be from 1 to 48 hours, preferably 1 to 18 hours. The reaction temperatures are between 150° and 300° C., preferably between 170° and 280° C.

The monomercapto compound of the formula IV can be added before or during the reaction.

Mixtures of the monomercapto compounds can also be employed. The addition can be by metering over a certain period of the reaction, in portions at certain times in the course of the reaction or by direct addition of the calculated total amount at a defined point in time of the reaction.

The polyarylene sulphides prepared according to the invention are distinguished by defined melt viscosities which can be reproduced within a narrow range. This is of great importance inasmuch as polymer melts with different flow processes which must be adapted to suit the particular intended purpose must be established for the processing of the polyarylene sulphides.

The melt viscosity can thus be influenced via the amount of thiol added. Low melt viscosities are in general thereby achieved with the addition of larger amounts of thiol compounds. The melt viscosities can be increased by addition of smaller amounts of thiol compounds.

Higher melt viscosities can thus be necessary for the production of films and fibres than for establishing injection moulding grades reinforced with glass fibre or glass fibre/mineral.

Another advantage of the polyarylene sulphides prepared according to the invention is the higher stability under exposure to heat. Only thus is it ensured that no further build-up or degradation, which can lead to a complete change in the pattern of properties, occurs during thermoplastic processing and the regenerated material can be reused again after processing.

Corrosion which leads to impurities in the PPS and to wear on the processing machines is in general observed during thermoplastic processing or on contact of PPS melts with metal surfaces. This corrosion is greatly reduced with the polyarylene sulphides prepared according to the invention, even on severe exposure to heat.

The reaction mixture can be worked up and the polyarylene sulphides isolated in a known manner.

The polyarylene sulphide can be separated off directly from the reaction solution or, for example, after first adding water and/or dilute acids or organic solvents with a low solubility for polyarylene sulphides, by the customary procedures, for example by filtration or by centrifugation. After the polyarylene sulphide has been separated off, it is in general subsequently washed with water. Washing or extraction with other washing liquids, which can also be carried out in addition to or after this washing, is also possible.

The polyarylene sulphide can also be obtained, for example, by distilling off the solvent and subsequent washing, as described above.

The alkali metal sulphides can also be obtained, for example, from H₂S and the aklali metal hydroxides or from the bisulphides and alkali metal hydroxides.

Certain amounts of alkali metal hydroxide can additionally be metered in, depending on the amount of alkali metal bisulphide contained in the reaction solution as an impurity in the alkali metal suphide. If appropriate, those compounds which split off or form alkali metal hydroxides under the reaction conditions can also be added, instead of the alkali metal hydroxides.

According to the invention, meta- and para-dihalogenoaromatics of the formula (I) and (II) can be employed. In this case, the ratio of meta- to para-dihalogenoaromatics can be up to 30:70.

If branched polyarylene sulphides are to be prepared, at least 0.05 mol % of a tri- or tetrahalogenoaromatic of the formula (III) should be employed.

Examples of dihalogenoaromatics of the formula (I) which are to be employed according to the invention are: p-dichlorobenzene, p-dibromobenzene, 1-chloro-4-bromobenzene, 1,3-dichlorobenzene, 1,3-dibromobenzene and 1-chloro-3-bromobenzene. They can be used by themselves or as a mixture with one another. 1,4-Dichlorobenzene and/or 1,4-dibromobenzene are particularly preferred.

Examples of dihalogenoaromatics of the formula (II) which are to be employed according to the invention are: 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,6-dichlorobenzene, 1-cyclohexyl-2,5-dichlorobenzene, 1-phenyl-2,5dichlorobenzene, 1-benzyl-2,4-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene, 2,4-dichlorotoluene, 2,4-dichloroxylene, 2,4-dibromocumene and 1-cyclohexyl-3,5-dichlorobenzene. They can be employed by themselves or as a mixture with one another.

Examples of tri- or tetrahalogenoaromatics of the formula (III) which are to be employed according to the invention are: 1,2,3-trichlorobenzene, 1,2,4-trichlorobenzene, 1,2,4-tribromobenzene, 1,3,5-trichloro-2,4,6trimethylbenzene, 1,2,3-trichloronaphthalene, 1,2,4-trichloronaphthalene, 1,2,6-trichloronaphthalene, 2,3,4-trichlorotoluene, 2,3,6-trichlorotoluene, 1,2,3,4-tetrachloronaphthalene, 1,2,4,5-tetrachlorobenzene, 2,2'-4,4'-tetrachlorobiphenyl and 1,3,5-trichlorotriazine.

In general, any polar solvent which guarantees an adequate solubility of the organic and, if appropriate, inorganic reactants under the reaction conditions can be employed for the reaction. N-Alkyllactams are preferably used.

N-Alkyllactams are those of aminoacids with 3–11 C atoms, which can optionally carry substituents which are inert under the reaction conditions on the carbon skeleton.

Examples of N-alkyllactams which are used are: N-methylcaprolactam, N-ethylcaprolactam, N-isopropylcaprolactam, N-isobutylcaprolactam, N-propylcaprolactam, N-butylcaprolactam, N-cyclohexylcaprolactam, N-methyl-2pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-methyl-3,4,5-trimethyl-2-pyrrolidone, N-methyl-2-piperidone, N-ethyl-2-piperidone, N-isobutyl-2-piperidone, N-methyl-6-methyl-2-piperidone and N-methyl-3-ethyl-2-piperidone.

Mixtures of the above solvents can be chosen.

Examples of mercapto compounds which can be employed according to the invention are: butylmercaptan, dodecylmercaptan, stearylmercaptan, benzylmercaptan, thiophenol, 1-mercaptonaphthalene, 2-mercaptonaphthalene, 4-mercaptodiphenyl, 4-mercaptodiphenyl ether, 4-mercaptodiphenyl sulphone, 4-mercaptodiphenyl sulphide, 4-mercaptodiphenyl ketone, 2-mercaptobenzoxazole, 2-mercaptobenzothiazole and 2-mercaptobenzimidazole, in addition to Li, Na, K, $NH_4$, Ca, Mg or Zn mercaptides thereof.

Preferably: stearylmercaptan, dodecylmercaptan, benzyl mercaptan, thiophenol, 2-mercaptobenzimidazole, 2-mercaptobenzothiazole, Na stearylmercaptide, Na thiophenolate, Na 2-mercaptobenzimidazole, Na 2-mercaptobenzothiazole and Zn salts of 2-mercaptobenzimidazole and 2-mercaptobenzothiazole.

If appropriate, the reaction can be carried out in the presence of the customary reaction accelerators, such as, for example: alkali metal carboxlates (DE-AS (German Published Specification) No. 2,453,749), lithium halides or alkali metal carboxylates (DE-OS (German Published Specification) No. 2,623,362), lithium chloride or lithium carboxylate (DE-OS (German Published Specification) No. 2,623,363), alkail metal carbonates in combination with alkali metal carboxylates (U.S. Pat. No. 4,038,259), lithium acetate (DE-OS (German Published Specification) No. 2,623,333), tri-alkali metal phosphates (DE-OS (German Published Specification) No. 2,930,710), trialkali metal phosphonates (DE-OS (German Published Specification) No. 2,930,797), alkali metal fluorides (DE-OS (German Published Specification) No. 3,019,732), alkali metal sulphonates (U.S. Pat. No. 4,038,260), lithium carbonate and lithium borate (U.S. Pat. No. 4,030,518), amino acids (DE-OS (German Published Specification) No. 3,428,984), defined amounts of lactam (DE-OS (German Published Specification) No. 3,428,985), anhydrides and esters of carboxylic acids (DE-OS (German Published Specification) No. 3,428,986) and N,N-dialkylcarboxylic acid amides.

The polyarylene sulphides prepared according to the invention can be mixed with other polymers, such as pigments and fillers—for example graphite, metallic powders, glass powder, quartz flour, glass fibres or carbon fibres—or the additives customary for polyarylene sulphides, for example customary stabilizers or mould release agents, can be added.

The melt flow properties of polyarylene sulphides are in general measured in accordance with ASTM 1238-70 at 316° C. using a 5 kg weight and are quoted in g/10 minutes.

If the melt flow values are high, however, this mixture can present difficulties because of the high discharge rate of the polymer melt.

The melt viscosity $\eta m$ of the polymer melt (in Pa.s) was therefore determined at 306° C. as a function of the shearing stress (in Pa) with the aid of an Instron rotation viscometer.

The melt viscosity can be determined in a very wide range from $10^{-1}$ to $10^7$ Pa.s in this manner. In the Instron rheometer, the polymer is melted between a fixed plate and a rotatable cone and the torque of the cone is determined. From the torque, the angular velocity and the apparatus data, the melt viscosity can be calculated as a function of the shearing stress. The rheometer model 3250 from Instron was used; diameter of the cone and of the plate 2 cm. The melt viscosity measured at a shearing stress of $\tau = 10^2$ Pa is stated.

After isolation from the reaction mixture, the polyarylene sulphides according to the invention have melt viscosities between 1 and $5 \times 10^3$, preferably 5 to $1 \times 10^3$. They can be processed in the customary manner. Films, fibres and, preferably, injection moulding compositions are thereby obtained.

These can be used, for example, as automobile components, fittings, electrical components, for example switches, electronic boards, components and apparatuses which are resistant to chemicals and weathering, such as pump housings and pump impellers, etching bath dishes, sealing rings, components of office machines and communication equipment, and domestic appliances, valves, ball bearing components, embedding compositions for electronic components and the like.

Polyarylene sulphides can likewise be analysed by chromatographic processes to provide information on their molecular weight and molecular weight distribution.

High pressure liquid chromatography (HPLC) or gel permeation chromatography (GPC), for example, are suitable for this.

The customary carrier materials, for example Li-Chroprep ®, Lobar ®, LiChrosorb ®, LiChrospher ®, Perisorb ®, Hibar ®, Fractogel ®, Fractosil ®, Ultra-styragel ®, Microstyragel ®, Zorbax ®, Bondagel ® and Shodex ®, can be used as the stationary phase.

The customary solvents can be used as the solvent and mobile phase. These should dissolve the polymer sufficiently.

Suitable examples are 1-chloronaphthalene, diphenyl, N-methylpyrrolidone, N-cyclohexylpyrrolidone, N-methylpiperidone, N-methylcaprolactam, N-methllaurinelactam, sulpholane, N,N'-dimethylimidazolidinone, N,N'-dimethylpiperazinone, hexamethylphosphoric acid triamide, 1-methyl-1-oxa-phospholane and mixtures thereof.

Absolute or relative calibrations can be carried out in the chromatographic analytical methods. Suitable calibration substances for relative are, for example, the customary polymers, such as, for example, polystyrene, polyethylene, polyethylene terephthalate, polybutylene terephthalate, polyesters, such as purely aromatic polyesters, polycarbonate, polyamides, such as PA 6, PA 66 and PA 11, polysulphones or polyether-sulphones.

The chromatography for analytical determination of the molecular weights or molecular weight distribution can be used under various pressures from 1 to 10 bar.

The chromatographic determination is carried out at a temperature from room temperature to 250° C.

Substances such as alkali metal halides, alkaline earth metal carboxylates and phosphonium or ammonium compounds can furthermore be added to the sample to be analysed to improve the measurement accuracy.

The weight-average molecular weights $M_w$ can be stated in the evaluation of the analytical data thus obtained. These are 15,000–150,000, preferably 15,000–100,000 and particularly preferably 15,000–80,000.

EXAMPLES

EXAMPLE 1

This example describes, for comparison, the preparation of polyphenylene sulphide according to U.S. Pat. No. 3,354,129, 1,2,4-trichlorobenzene being metered in as a branching agent to increase the melt viscosity.

129 g of sodium sulphide tri-hydrate (corresponding to 1 mole of $Na_2S$) and 300 g of N-methyl-2-pyrrolidone were brought together in an autoclave equipped with stirrers. The mixture was flushed with nitrogen and slowly warmed up to 202° C. A total of 19 ml of water distilled off during this procedure. The mixture was then cooled down to about 160° C. and 147 g of p-dichlorobenzene (=1 mole) and 1.81 g of 1,2,4-trichlorobenzene (1 mol %, based on the moles of p-dichlorobenzene) in about 50 g of N-methyl-2-pyrrolidone were added. The reaction mixture is warmed to 245° C. under the preliminary nitrogen pressure of 2.5 bar in the course of 30 minutes, during which the pressure rises to 10 bar, and this temperature is maintained for 3 hours. After cooling of the room temperature, a grey solid is isolated and is subsequently subjected to careful washing with water to remove the inorganic concomitant material.

The product is dried at 80° C. in vacuo to give 100.3 g (93%) of poly-p-phenylene sulphide with a melt viscosity of 20 Pa.s (measured at $10^2$ Pa and 306° C.).

Example 1 a, b, c

The experiment from Example 1 is repeated three times and the melt viscosity is in each case determined after working up:

(a) $\eta m = 13$ Pa.s
(b) $\eta m = 6$ Pa.s
(c) $\eta m = 27$ Pa.s

When the experimental conditions remain constant, varying melt viscosity values result.

EXAMPLE 2

856.75 g of sodium sulphide hydrate (about 60% pure), 135 g of 2.5% strength sodium hydroxide solution and 108 g of caprolactam were metered into 2,100 g of N-methylcaprolactam and 940.8 g of p-dichlorobenzene at a temperature of 220° C.

The rate of metering in depends on the conversion and is adjusted so that the temperature of 220° C. can be maintained while the reaction vessel is simultaneously additionally heated. During metering, the water is simultaneously removed from the reaction.

After the metering, the reaction is kept under reflux for a further 4 hours and 1.75 g (0.25 mol %) of thiophenol in 50 ml of N-methylcaprolactam are then metered in. After a further reaction time of 3 hours, the PPS is precipitated in water, washed free from electrolyte and briefly extracted with an organic solvent. The dried p-polyphenylene sulphide has a melt viscosity of 75 Pa.s (measured at $10^2$ Pa and 306° C.).

Example 3 (Comparison)

This example is as Example 2, but without thiophenol. A melt viscosity $\eta m$ of 680 Pa.s (measured at $10^2$ Pa and 306° C.) is achieved. This polyphenylene sulphide can be processed only with difficulty in the presence of relatively large amounts of mineral fillers or glass fibres, because of its reduced flowability.

Example 4

This example is as Example 2; however, 10.68 g (1 mol %) of 2-mercaptobenzothiazole are metered in after 4 hours 30 minutes. The resulting p-polyphenylene sulphide has a melt viscosity of 50 Pa.s (measured at $10^2$ Pa and 306° C.).

Example 5

This example is as Example 2; however, methyloxophospholane is used as the solvent. A p-polyphenylene sulphide with a melt viscosity of 45 Pa.s (measured at $10^2$ Pa and 306° C.) is obtained.

Example 6

This example is as Example 4; however, 4.51 g (0.35 mol %) of dodecylmercaptan were added. A melt viscosity of 55 Pa.s (measured at $10^2$ Pa and 306° C.) is obtained.

Example 7

The experiment from Example 2 was repeated 5 times. The same viscosity was always obtained, with very good reproducibility, within a small range of error:

TABLE 1

| | |
|---|---|
| Sample 1 | $\eta m = 70$ Pa.s (at $10^2$ Pa and 306° C.) |
| Sample 2 | $\eta m = 67$ Pa.s |
| Sample 3 | $\eta m = 68$ Pa.s |
| Sample 4 | $\eta m = 72$ Pa.s |
| Sample 5 | $\eta m = 73$ Pa.s |

Example 8

This example is as Example 2; however, 1.75 g (0.25 mol %) of thiophenol are initially taken, instead of being added in the post-condensation period. The polyphenylene sulphide obtained after working up has a melt viscosity of $\eta m = 80$ Pa.s (at $\tau = 10^2$ Pa and 306° C.).

Example 9

This example is as Example 7; however, 2.5 g (0.35 mol %) of thiophenol are initially taken. The polyphenylene sulphide thus obtained has a melt viscosity of $\eta m = 45$ Pa.s (at $\tau = 10^2$ Pa and 306° C.).

Example 10

This example is as Example 8; however, 10.68 g (1 mol %) of 2-mercaptobenzothiazole are initially taken. A polyphenylene sulphide with a melt viscosity of $\eta m = 75$ Pa.s (at $\tau = 10^2$ Pa and 306° C.) is thereby obtained.

Example 11

This example is as Example 8; however, 5.32 g (0.5 mol %) of 2-mercaptobenzothiazole are initially taken. The polyphenylene sulphide thus obtained has a melt viscosity of $\eta m = 140$ Pa.s (at $\tau = 10^2$ Pa and 306° C.).

Example 12

This example is as Example 7; but N-butylcaprolactam was used as the solvent instead of N-methylcaprolactam. The polyphenylene sulphide has a melt viscosity of $\eta m = 38$ Pa.s (at $\tau = 10^2$ Pa and 306° C.).

Corrosion

The corrosion was determined by titration of acid emissions obtained in a collecting vessel containing water by heating the polyphenylene sulphide sample in a stream of air at 350° C. in the course of 1 hour, with normal sodium hydroxide solution.

The corrosion factor $f = $ $$\frac{\text{Corrosion of the corresponding example}}{\text{Corrosion of Comparison Example 1}}$$

TABLE 2

| Example | f |
|---|---|
| 2 | 0.91 |
| 4 | 0.90 |
| 5 | 0.87 |
| 6 | 0.85 |
| 8 | 0.95 |
| 9 | 0.81 |
| 10 | 0.89 |
| 11 | 0.90 |

Stability of the melt

The polyphenylene sulphides from Example 1 (comparison example) and Example 7, batch 1-5, were melted at 300° C. with exclusion of air and kept at this temperature for 15 minutes. A sample of the melt was then measured on a rotary viscometer at $10^2$ Pa and 306° C. This procedure was repeated once more with the minimum amount of molten material. Table 3 shows that the polyphenylene sulphides prepared according to the invention have a high stability of the melt compared with the comparison material (Example 1) which is not according to the invention:

|  | $\eta m^*$ Initial | $\eta m^*$ 1st melt | $\eta m^*$ 2nd melt |
|---|---|---|---|
| Comparison material |  |  |  |
| Example 1 | 20 | 70 | 320 |
| Example 7, Batch 1 | 51 | 55 | 61 |
| Example 7, Batch 2 | 47 | 50 | 57 |
| Example 7, Batch 3 | 46 | 50 | 58 |
| Example 7, Batch 4 | 50 | 59 | 58 |
| Example 7, Batch 5 | 46 | 49 | 55 |

*Melt viscosity $\eta m$ measured in Pa.s at $10^2$ Pa and 306° C.

We claim:

1. A process for the preparation of branched or unbranched polyarylene sulphide which comprises reacting:

(a) 50–100 mol % of at least one dihalogenoaromatic of the formula

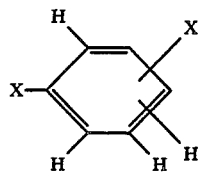

(I)

and 0–50 mol % of at least one dihalogenoaromatic of the formula

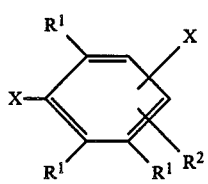

(II)

in which
the symbols X represent halogen, in the meta- or paraposition relative to one another and
the symbols $R^1$ and $R^2$ are identical or different and each is hydrogen, $C_1$-$C_4$-alkyl, $C_5$-$C_{10}$-cycloalkyl, $c_6$-$C_{10}$-aryl, $C_7$-$C_{10}$-alkylaryl, $C_7$-$C_{14}$-arylalkyl, and when two radicals $R^1$ in the ortho-position relative to one another are linked together, they form an aromatic ring or a heterocyclic ring containing one to 3 heteroatoms, and one radical $R^1$ is always other than hydrogen;

(b) 0–5 mol %, based on the sum of the dihalogenoaromatics of the formula I and II, of a tri- or tetrahalogenoaromatic of the formula $$ArX_n \qquad (III)$$

wherein
Ar is an aromatic $C_6$-$C_{14}$ radical or a heterocyclic radical with 5–14 ring atoms having one to 3 ring heteroatoms, X represents halogen, and
n represents the number 3 or 4, and (c) 50–100 mol % of an alkali metal sulphide or alkali metal sulphide mixed with small amounts of alkali metal hydroxide, and 0–50 mol % of an alkali metal bisulphide, with for the molar ratio of (a+b):c to be in the range from 0.75:1 to 1.25:1, and conducting the reaction of (a), (b) and (c) in the presence of 0.05–5.0 mol %, of a monomercapto compound of the formula IV $$(R-A-S)_t W \qquad (IV)$$

in which
t represents the number 1 or 2,
SW represents a mercapto or mercaptide group,
W represents hydrogen, an alkali metal, or $NH_4^+$, and, where t represents the number 2, W also represents an alkaline earth metal or zinc, R represents hydrogen, $C_1$-$C_8$ alkyl, $C_3$-$C_6$ cycloalkyl, alkaryl or aralkyl,
A represents a $C_1$-$C_{30}$ aliphatic or $C_6$-$C_{24}$ aromatic radical or a heterocyclic radical containing one to three heteroatoms.

2. Process according to claim 1 wherein for the monomercapto compound of formula IV, A represents $C_1$-$C_{18}$-alkylidene,

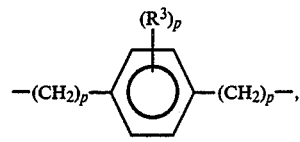

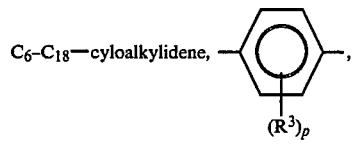

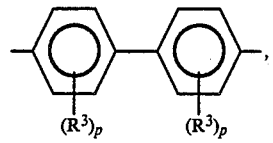

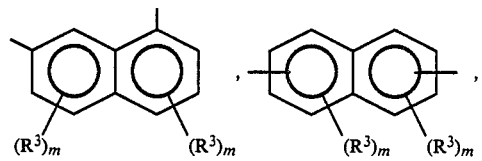

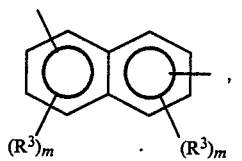

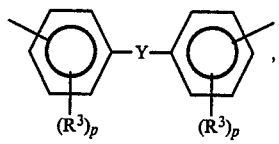

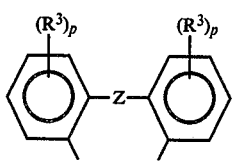

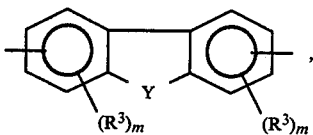

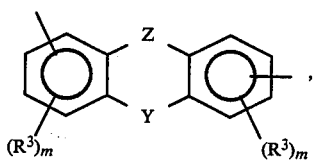

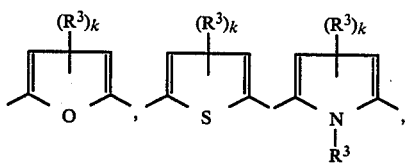

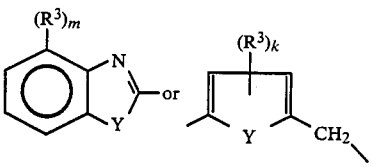

wherein
the radicals $R^3$ independently of one another represent $C_1$-$C_8$ alkyl, alkaryl, aralkyl, $C_3$-$C_6$-acycloalkyl or hydrogen, Y represents O, $NR^3$, S, $SO_2$ or CO, Z represents $C_1$-$C_6$-alkylidene, $C_2$-$C_6$-cyclo alkylidene, CO, —S—,

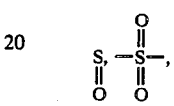

O or Z represents a single bond,
k represents the number 0, 1 or 2
m represents the number 0, 1, 2 or 3
p represents the number 0, 1, 2, 3 or 4.

3. Process according to claim 1 wherein the reaction is carried out in the absence of water.

4. Process according to claim 1 wherein reactants (a), (b) and (c) and a polar solvent are brought together and reacted at temperatures ≧200° C., with simultaneous dehydration.

5. Process according to claim 1 wherein the monomercapto compound of formula IV is at least one of thiophenol, 2-mercaptothiothiazole, 2-mercaptobenzimidazole or n-dodecylmercaptan.

6. Process according to claim 1 wherein the reaction is carried out under a low pressure or under normal pressure.

7. Process according to claim 4 wherein N-methylcaprolactam is the polar solvent.

* * * * *